(12) United States Patent
Ibison (10) Patent No.: US 9,628,319 B2
(45) Date of Patent: Apr. 18, 2017

(54) TIME-ALIGNMENT OF SIGNALS SUFFERING FROM QUADRATURE ERRORS

(71) Applicant: Altiostar Networks, Inc., Tewksbury, MA (US)

(72) Inventor: John N. Ibison, Bradford (GB)

(73) Assignee: AltioStar Networks, Inc., Tewksbury, MA (US)

( * ) Notice: Subject to any disclaimer, the term of this patent is extended or adjusted under 35 U.S.C. 154(b) by 0 days.

(21) Appl. No.: 14/822,792

(22) Filed: Aug. 10, 2015

(65) Prior Publication Data
US 2017/0048096 A1 Feb. 16, 2017

(51) Int. Cl.
H04L 5/12 (2006.01)
H04L 27/38 (2006.01)
H04L 1/20 (2006.01)
H04L 27/36 (2006.01)
H04L 7/00 (2006.01)

(52) U.S. Cl.
CPC ............ H04L 27/3863 (2013.01); H04L 1/20 (2013.01); H04L 7/0029 (2013.01); H04L 27/36 (2013.01)

(58) Field of Classification Search
CPC ............. H04L 27/34; H04L 2025/0342; H03F 1/3211; H03F 1/3217

USPC ...................... 375/261, 343; 330/149; 455/91
See application file for complete search history.

(56) References Cited

U.S. PATENT DOCUMENTS

| | | | | |
|---|---|---|---|---|
| 7,463,866 B1* | 12/2008 | Chen | ..................... | H04B 1/0475 375/296 |
| 2007/0096811 A1* | 5/2007 | Kokkeler | .............. | H03F 1/3247 330/149 |
| 2009/0296862 A1* | 12/2009 | Nakaya | ................ | H04L 27/2676 375/343 |
| 2010/0225390 A1* | 9/2010 | Brown | ...................... | H03F 1/26 330/149 |
| 2011/0295598 A1* | 12/2011 | Yang | ...................... | G10L 21/038 704/205 |
| 2013/0147550 A1* | 6/2013 | Yang | ..................... | H03F 1/3247 330/149 |

* cited by examiner

*Primary Examiner* — Daniel Washburn
*Assistant Examiner* — Fitwi Hailegiorgis
(74) *Attorney, Agent, or Firm* — Mintz Levin Cohn Ferris Glovsky and Popeo, P.C.

(57) ABSTRACT

Data is received characterizing a first signal and a second signal. The first signal and a function of the second signal is compared at a plurality of time-shifts to estimate a time-difference between the first signal and the second signal. The function of the second signal includes the second signal, a complex conjugate of the second signal, and a constant. The comparison is provided. At least one of receiving, comparing, and providing is performed by at least one processor of at least one computing system.

17 Claims, 10 Drawing Sheets

TIME-ALIGNMENT OF SIGNALS SUFFERING FROM QUADRATURE ERRORS

TECHNICAL FIELD

The subject matter disclosed herein generally relates to transmission of data signals, such as digitally encoded voice or data signals, and in particular, to the alignment of these signals.

BACKGROUND

Quadrature amplitude modulation is a modulation scheme utilizing two carrier waves, usually sinusoids, which are out of phase with each other by 90°. The amplitude of the two waves, 90° out-of-phase with each other (e.g., in quadrature) can be changed (e.g., modulated or keyed) to represent a given data signal. Amplitude modulating two carriers in quadrature can be equivalently viewed as both amplitude modulating and phase modulating a single carrier.

Quadrature amplitude modulation can be performed by splitting a flow of bits to be transmitted into two equal parts to generate two independent signals to be transmitted. These signals are encoded separately and in one signal (e.g., in an "in phase" channel) is multiplied by a cosine, while the other signal (e.g., in a "quadrature" channel) is multiplied by a sine, thus producing two signals with a phase difference of 90°. These in phase and quadrature signals can be added together, amplified, and transmitted through the real channel.

Pre-distortion is a technique used to improve the linearity amplifiers, such as radio transmitter amplifiers. Pre-distortion inversely models the amplifier's gain and phase characteristics and, when combined with the amplifier, produces an overall system that is more linear and reduces the amplifier's distortion. In essence, inverse distortion is introduced into the input of the amplifier, thereby cancelling any non-linearity the amplifier might have. Calculation of the pre-distortion can rely on matching a copy of the (clean) input signal with the (distorted) amplified signal and then determining how best to pre-distort. To make the signal comparison meaningful, the input and the amplified signals can be time-aligned—so that the differences in the two signals is due to distortion and not simply due to sampling the signal at a different point in time.

SUMMARY

In an aspect, data is received characterizing a first signal and a second signal. The first signal and a function of the second signal is compared at a plurality of time-shifts to estimate a time-difference between the first signal and the second signal. The function of the second signal includes the second signal, a complex conjugate of the second signal, and a constant. The comparison is provided. At least one of receiving, comparing, and providing is performed by at least one processor of at least one computing system.

One or more of the following features can be included in any feasible combinations. For example, the comparing can include calculating an error statistic between the first signal and the function of the second signal for at least the plurality of time-shifts. The error statistic can include a power difference between the first signal and the function of the second signal. The estimated time difference can include one of the plurality of time-shifts corresponding to a minimum calculated error statistic. The error statistic can be interpolated to determine an interpolated error statistic. The estimated time difference can correspond to a minimum of the interpolated error statistic. The first signal and the second signal can be aligned, based on the comparison and in time, by a value corresponding to the estimated time-difference. The plurality of time-shifts can include a range of values between a predetermined low value and a predetermined high value. The first signal can be a digitally encoded transmission signal. The second signal can be generated by at least one of pre-distorting and applying quadrature modulation to the first signal, the second signal for transmission in a radio-transmitter. Providing the comparison can include at least one of storing, transmitting, and processing the comparison. The constant can be a bias caused by local oscillation in the second signal. Providing the comparison can include time aligning the first signal and the second signal based on the comparison. The function of the second signal can include a linear combination.

Computer program products are also described that comprise non-transitory computer readable media storing instructions, which when executed by at least one data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

DETAILED DESCRIPTION

Quadrature amplitude modulation can introduce errors into a signal, which can make it difficult to time-align an input signal and an amplified (and/or modulated) signal. While quadrature modulation correction techniques exist, they generally require the input signal and the amplified signal to be time-aligned (or at least the time-difference between these signals to be known). Thus, it can be challenging to time-align and perform quadrature modulation correction ("QMC") on signals having both an unknown time-shift difference and having quadrature modulation errors. Such a condition can occur, for example, when a radio transmitter is initialized.

The current subject matter provides for determining a time-difference between two signals and time-alignment of those signals using a technique that can be insensitive to quadrature modulation errors. The current subject matter can compare the input signal to a combination of the output signal with the conjugate of the output signal over a range of possible time-shifts to calculate an error statistic. The minimum error statistic (or minimum of an interpolated error statistic) can correspond to an estimated time-difference.

Figure 1:
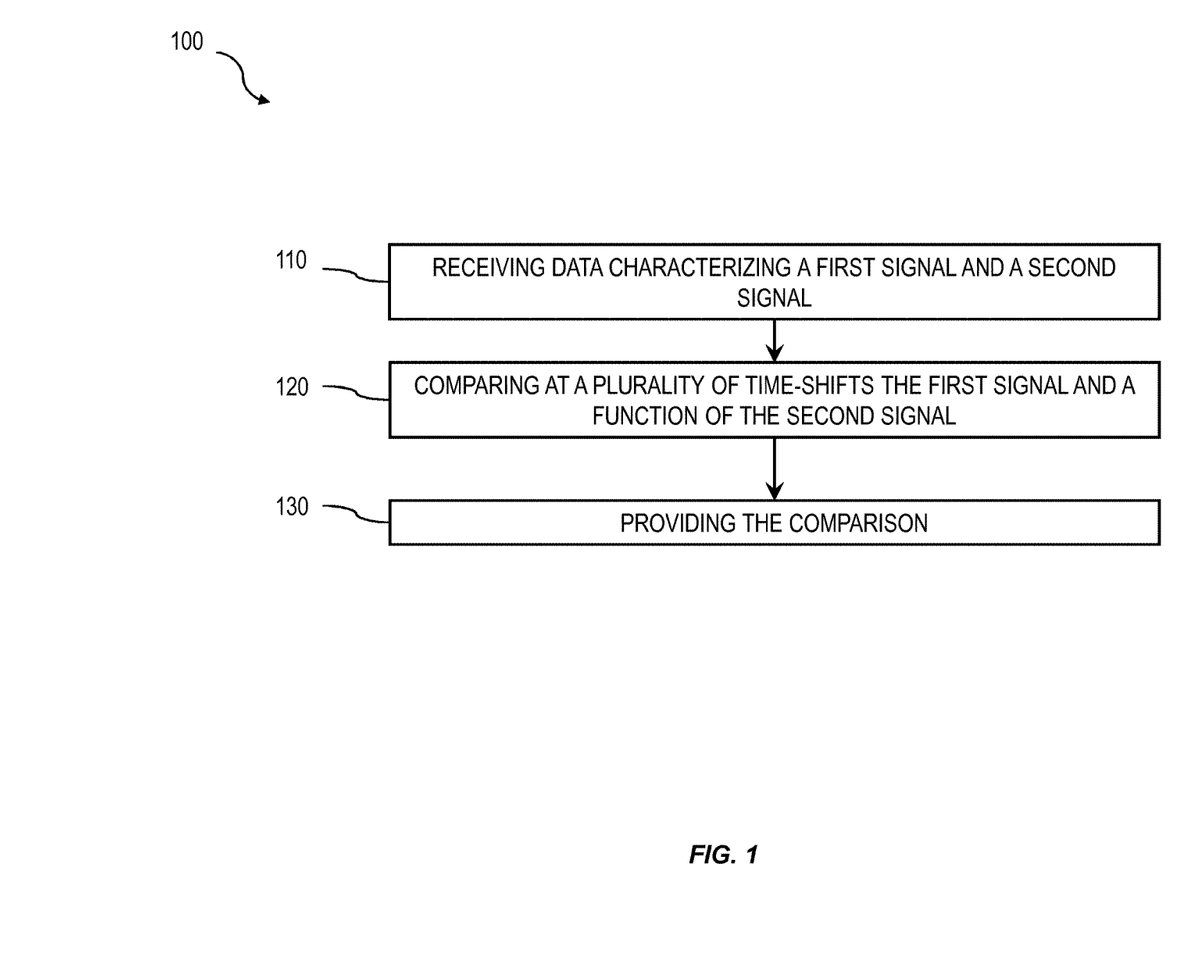
FIG. 1 is a process flow diagram illustrating an exemplary method of comparing two signals to estimate a time-difference, according to some implementations of the current subject matter.

FIG. 1 is a process flow diagram illustrating an exemplary method 100 of comparing two signals to estimate a time-difference, according to some implementations of the current subject matter. At 110, data characterizing two signals can be received. For example, the signals can include an input signal (such as a digitally encoded voice or data signal) and an amplified (or output) signal. The amplified signal can be a processed version of the input signal, in which processing can include amplification, DPD, and quadrature modulation.

The received signals can be compared across a range of different time shifts at 120 to estimate a time-difference between the received signals. The input signal can be compared to a function of the amplified signal, for example, by calculating an error statistic. The function can include a linear combination of the amplified signal, the complex conjugate of the amplified signal, and a constant value. The error statistic can include a power difference between the function of the amplified signal and the input signal. The coefficients forming the linear combination can be chosen to minimize the value of the error statistic. Such an error statistic can account for quadrature errors such as IQ imbalance, crosstalk, and effects of an imperfect modulator. Moreover, the accuracy of the error statistic is independent of the degree of quadrature modulation errors present in the input and amplified signals. In some implementations, the amplified signal can be compared to a function of the input signal.

The time-shift corresponding to the minimum of the error statistic (or an interpolation of the error statistic) can be used as the estimated time-difference or estimated time-alignment value.

The comparison can be provided at 130. Providing can include transmitting, storing, and processing. For example, the time shift corresponding to the minimum of the error statistic can be stored in memory for use in further processing of transmission signals. In some implementations, providing the comparison can include time aligning the input and amplified signals based on the comparison.

In some example implementations, the error-statistic can be expressed as $$E_n(x, y) = \text{Min}_{A,B,C} \left\{ \sum_k |y_{k+n} - (Ax_k + B\overline{x_k} + C)|^2 \right\} \quad (1)$$

where over-bar indicates a complex conjugate; x is the input signal (sampled at time=1, 2, ..., k); y is the amplified or output signal (sampled at time=1, 2, ..., k); and A, B, and C are complex values. At each tested time-shift n the values of (A, B, C) are chosen to minimize the value of $E_n$. The value of n that yields the smallest value of $E_n$ can then approximate the time-shift between the signals.

The current subject matter can be insensitive to quadrature modulation errors. Quadrature errors can appear as: IQ imbalance (the amount of the I-component (in phase) may be amplified differently from the Q-component (90-degrees phase shifted) component of the complex IQ signal); cross talk (can be represented as a fraction of the complex conjugate added to the input signal); and local oscillator (when a signal is sampled, local oscillation can appear as a constant IQ value added to the signal).

The error statistic can also be expressed as $$E_n = \sum_k |y_{k+n} - (A_n x_k + B_n \overline{x_k} + C_n)|^2 \quad (2)$$

Where n denotes a time-shift.

For a given value of n the complex values $(A_n, B_n, C_n)$ are chosen to give the minimum of $E_n$, which can be determined using a number of methods. In some example implementations least squares estimation can be used. Since the best $(A_n, B_n, C_n)$ give a minimum E in which partial derivatives vanish, which can be expressed as:

$$\frac{\partial E_n}{\partial A_n} = 0 \quad (3)$$

$$\frac{\partial E_n}{\partial B_n} = 0$$

$$\frac{\partial E_n}{\partial C_n} = 0$$

the error statistic can be expressed (after re-arranging terms) as:

$$\begin{pmatrix} \sum_k |x_k|^2 & \sum_k \overline{x_k}^2 & \sum_k \overline{x_k} \\ \sum_k x_k^2 & \sum_k |x_k|^2 & \sum_k x_k \\ \sum_k x_k & \sum_k \overline{x_k} & \sum_k 1 \end{pmatrix} \begin{pmatrix} A_n \\ B_n \\ C_n \end{pmatrix} = \begin{pmatrix} \sum_k y_{k+n} \overline{x_k} \\ \sum_k y_{k+n} x_k \\ \sum_k y_{k+n} \end{pmatrix} \quad (4)$$

and in matrix form can be expressed as $$H\begin{pmatrix} A_n \\ B_n \\ C_n \end{pmatrix} = p_n \quad (5)$$

Solving the above equation by matrix inversion provides $$\begin{pmatrix} A_n \\ B_n \\ C_n \end{pmatrix} = H^{-1} p_n \quad (6)$$

The error statistic can now be expressed as:

$$E_n = \sum_k |y_{k+n} - A_n x_k - B_n \overline{x_k} - C_n|^2 \quad (7)$$

Since the matrix H above is independent of n it can be calculated only once and the inverse can be calculated only once. For each value of n, a basic matrix multiplication can be performed to yield complex values ($A_n$, $B_n$, $C_n$) at a given n.

The error statistic can be expanded to illustrate that it only depends on the y signal through the following summations (which include all the summations required in the matrix form used to calculate the intermediate coefficients ($A_n$, $B_n$, $C_n$)):

$$Y_{sums} = \begin{pmatrix} \sum_k |y_{k+n}|^2 \\ \sum_k y_{k+n} \overline{x_k} \\ \sum_k y_{k+n} x_k \\ \sum_k y_{k+n} \end{pmatrix} \quad (8)$$

And dependence on x is through the following:

$$X_{sums} = \begin{pmatrix} \sum_k |x_k|^2 \\ \sum_k x_k^2 \\ \sum_k x_k \end{pmatrix} \quad (9)$$

In some implementations, in order to compute the error statistic, conceptually x can be held fixed and y can undergo time shifts. Thus the x summations can be computed only once and, for each (shifted or interpolated y signal) the y summations can be computed only once. For an N-length signal calculation a single error statistic $E_n$ requires the order of: 3N multiplications and 4N additions.

In some implementations, a range of time shifts (to, hi) can be iterated over to yield a vector or array of error statistic values:

$$EC = (E_{lo}, E_{lo+1}, \ldots, E_{hi}) \quad (10)$$

The value at index n (n=lo, lo+1, . . . , hi) can represent the error statistic at time-alignment value n. The minimum error statistic can be found by finding the minimum value in EC. For a physical device, the time-difference between input and amplified signals can be known to lie within certain bounds (e.g., hi, lo), since the time-alignment value represents the time it takes the device to process a signal between two points. Because the true time-alignment value is often temperature or frequency dependent and is affected by environmental factors, for a given piece of equipment in use, values for lo and hi can be predetermined.

In some example implementations, EC can be interpolated to improve the time-shift estimate. In some implementations, interpolation by a factor of M can be performed by inserting M−1 zeroes between each point and using a low-pass finite impulse response ("FIR") filter to smooth the result. A sequence EF of interpolated error statistic values can be indexed as:

$$EF = (E_{lo,0}, E_{lo,1}, \ldots, E_{lo,M-1}, \ldots, E_{hi,0}, \ldots, E_{hi,M-1}) \quad (11)$$

Suppose, for example, the minimum error statistic occurs at $E_{n,m}$. The estimated time-alignment value can be expressed as:

$$T_a = n + \frac{m}{M} \quad (12)$$

The estimated time-alignment value $T_a$ can be stored in memory, transmitted (e.g., to another signal processing module), or further processed.

Figure 2:
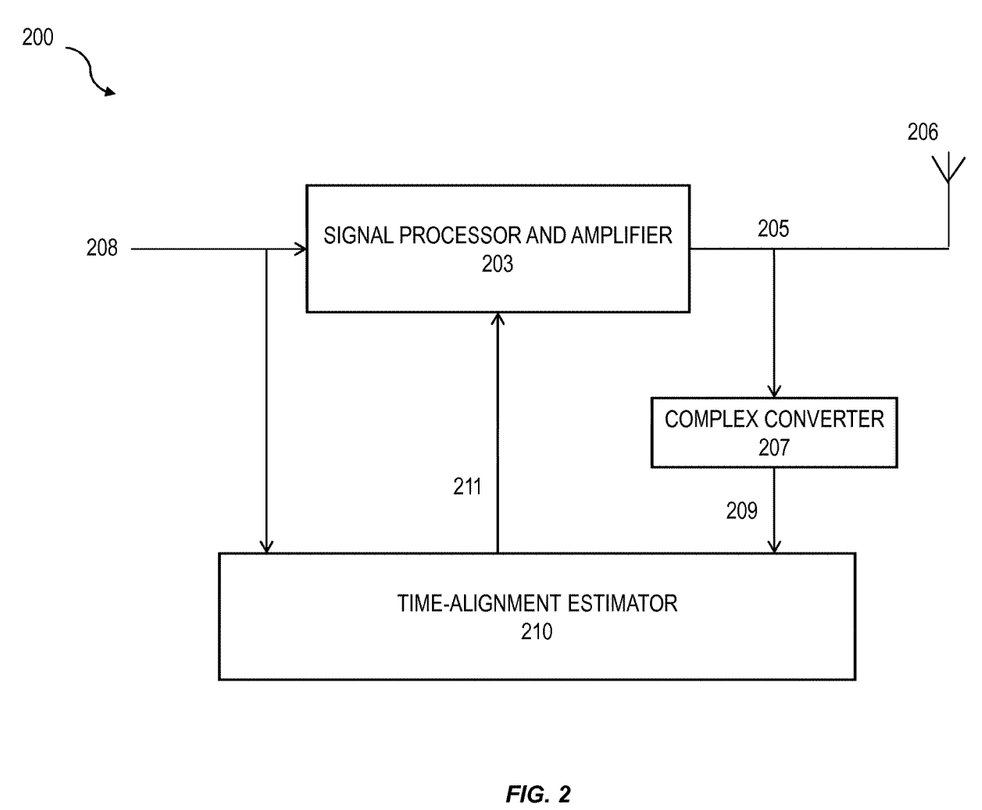
FIG. 2 is a functional block diagram of an exemplary system for estimating a time-alignment value within a radio-transmitter, according to some implementations of the current subject matter.

FIG. 2 is a functional block diagram 200 of an exemplary system for estimating a time-alignment value within a radio-transmitter, according to some implementations of the current subject matter. The radio-transmitter can use DPD to clean (e.g., process) a transmission signal before amplification and transmission. An input signal 208 (e.g., x), which can be a complex baseband signal, can be received by the system. The input signal 208 can be processed and amplified by signal processor and amplifier 203 to generate a transmission signal 205. The transmission signal 205 can be sent to an antenna 206 and broadcast. In addition, the transmission signal 205 can be converted to complex IQ representation by complex converter 207 to become amplified signal 209 (e.g., y). Time-alignment estimator 210 can estimate a time-alignment value 211 using, for example, input signal 208 (e.g., x) and amplified signal 209 (e.g., y). The time-alignment value 211 can be provided to the signal processor and amplifier 203.

Figure 3:
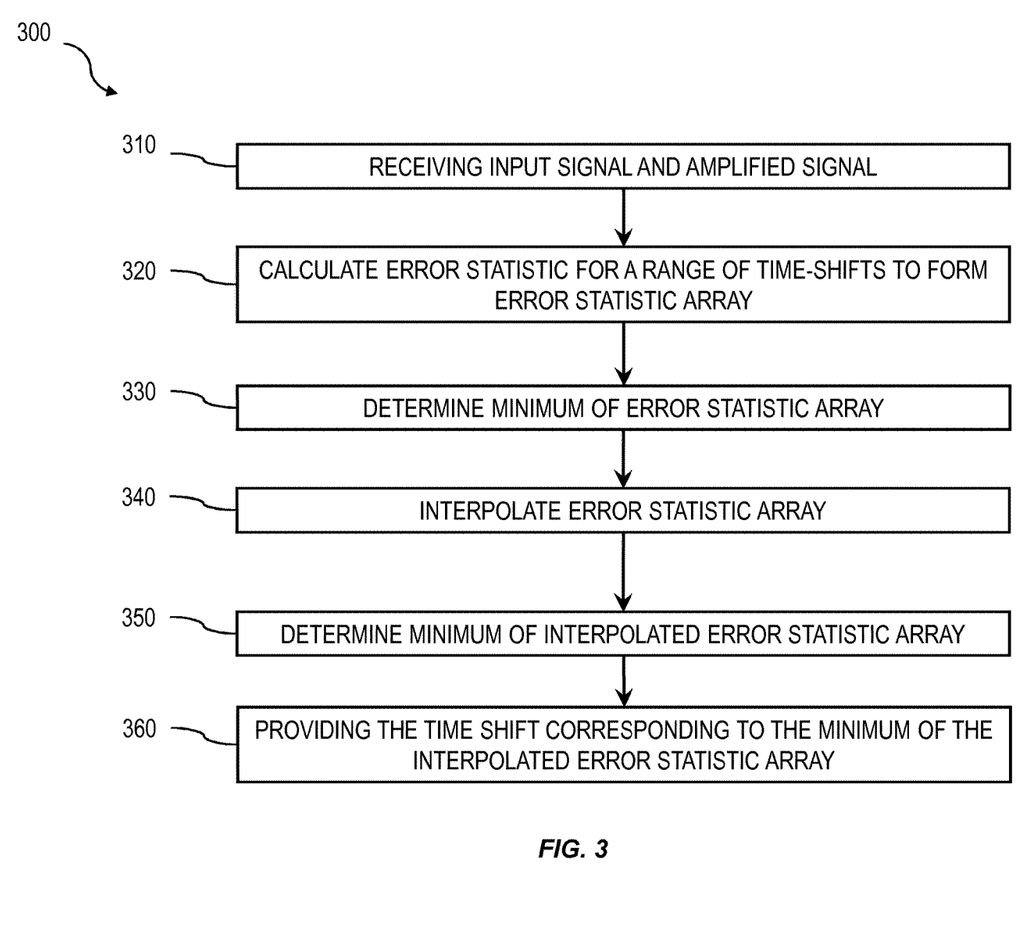
FIG. 3 is a process flow diagram illustrating an exemplary process for estimating a time-alignment value performed by time-alignment estimator, according to some implementations of the current subject matter.

FIG. 3 is a process flow diagram 300 illustrating an exemplary process for estimating a time-alignment value performed by time-alignment estimator 210, according to some implementations of the current subject matter. At 310, input signal 208 (e.g., x) and amplified signal 209 (e.g., y) can be received by the time-alignment estimator 210. An error statistic $E_n$ can be calculated at 320 for each time point in a range between lo and hi, which are predetermined, to form error EC. The error statistic $E_n$ can be computed according to:

$$E_n = \sum_k |y_{k+n} - (A_n x_k + B_n \overline{x_k} + C_n)|^2 \quad (13)$$

The smallest error statistic in EC can be found by determining the minimum of EC at 330. The time point corresponding to the minimum of EC can be stored as a coarse time-alignment value. The error statistic EC can be interpolated at 340 using an FIR filter. The minimum error statistic in the interpolated error statistic EF can be found at 350. At 360, the time point corresponding to the minimum error statistic can be provided as the estimated time-alignment value.

In some example implementations, the process of estimating a time-alignment value can be repeated multiple times using different portions of the input signal and/or the amplified signal. A mean of the multiple estimated time-alignment values can be used as a final time-alignment estimate.

Figure 4A:
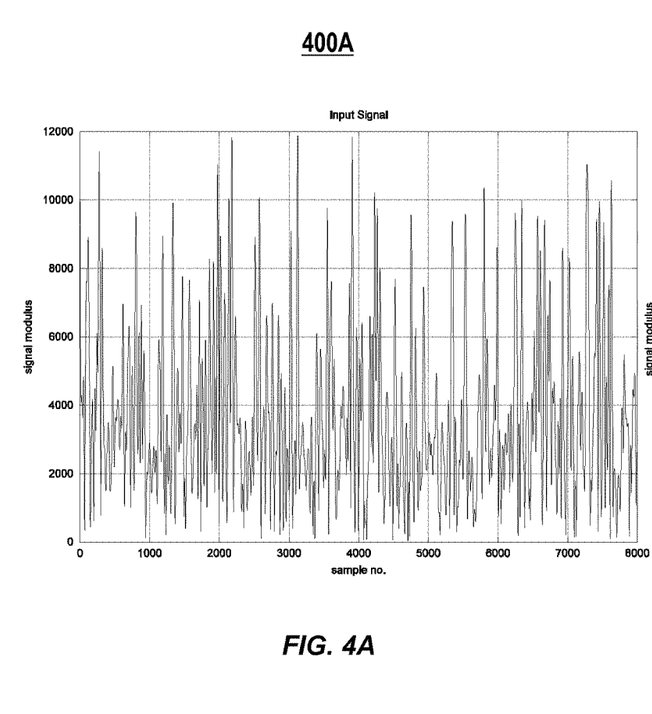
FIG. 4A is a plot illustrating magnitude of an exemplary input signal, according to some implementations of the current subject matter.
Figure 4B:
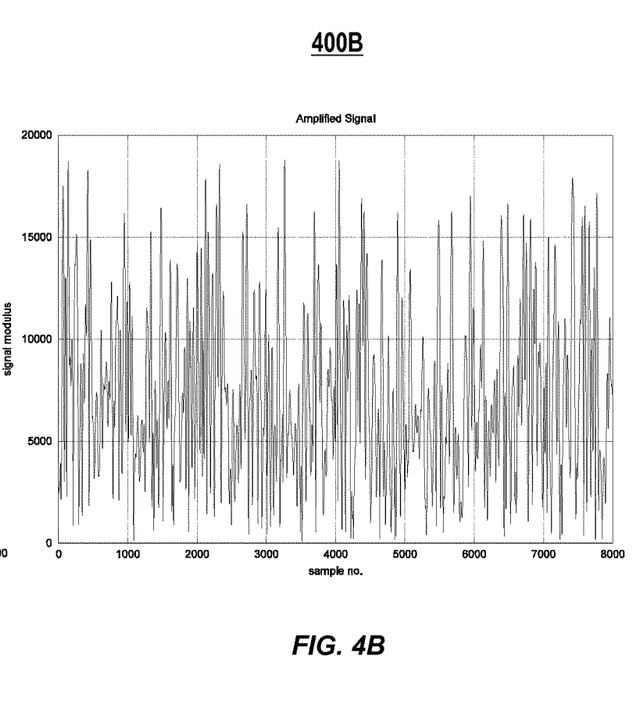
FIG. 4B is a plot illustrating magnitude of a corresponding amplified signal, according to some implementations of the current subject matter.

FIG. 4A is a plot 400A illustrating magnitude of an exemplary input signal 208 (e.g., x) and FIG. 4B is a plot 400B illustrating magnitude of a corresponding amplified signal 209 (e.g., y), according to some implementations of the current subject matter. Magnitude is shown on the vertical axis and time is shown on the horizontal axis. The example signals do not exhibit much quadrature error and so appear very similar apart from the amplified signal 209 (e.g., y) (FIG. 4B) being offset in time from the input signal 208 (e.g., x) (FIG. 4A) by about 140 sample points.

Figure 5:
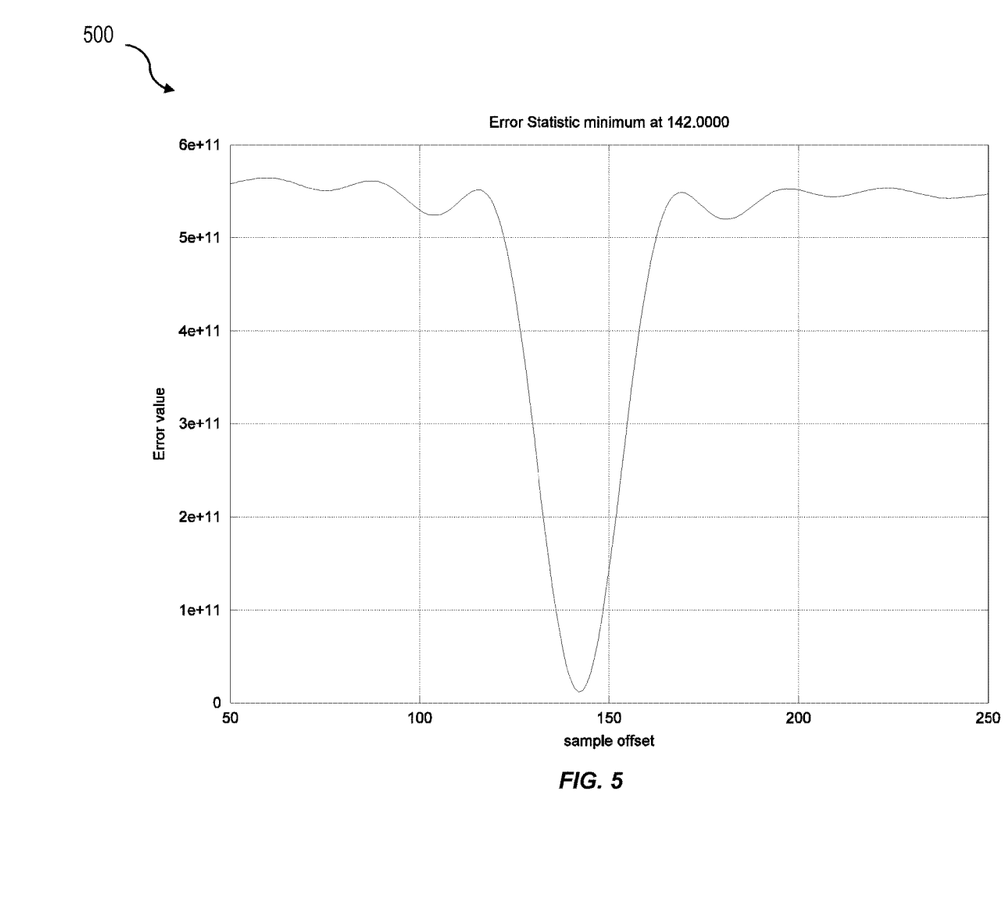
FIG. 5 is a plot illustrating a graph of an error statistic computed using the exemplary input signal and amplified signal from FIGS. 4A and 4B.
Figure 6:
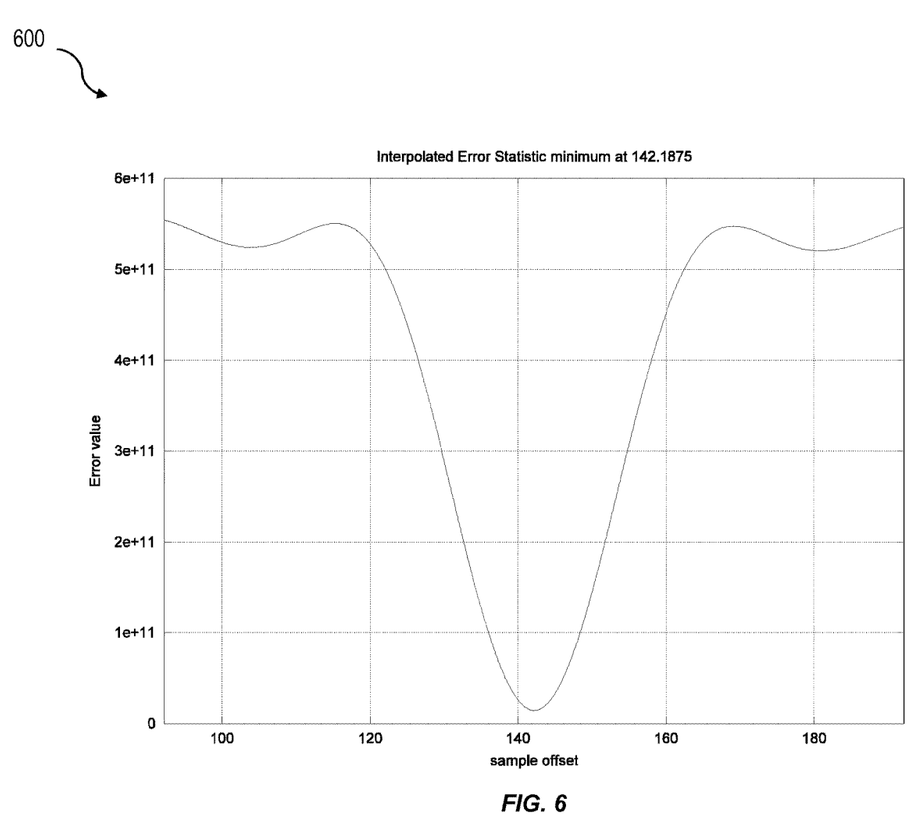
FIG. 6 is a plot illustrating an interpolated error statistic of the exemplary error statistic illustrated in FIG. 5.
Figure 7:
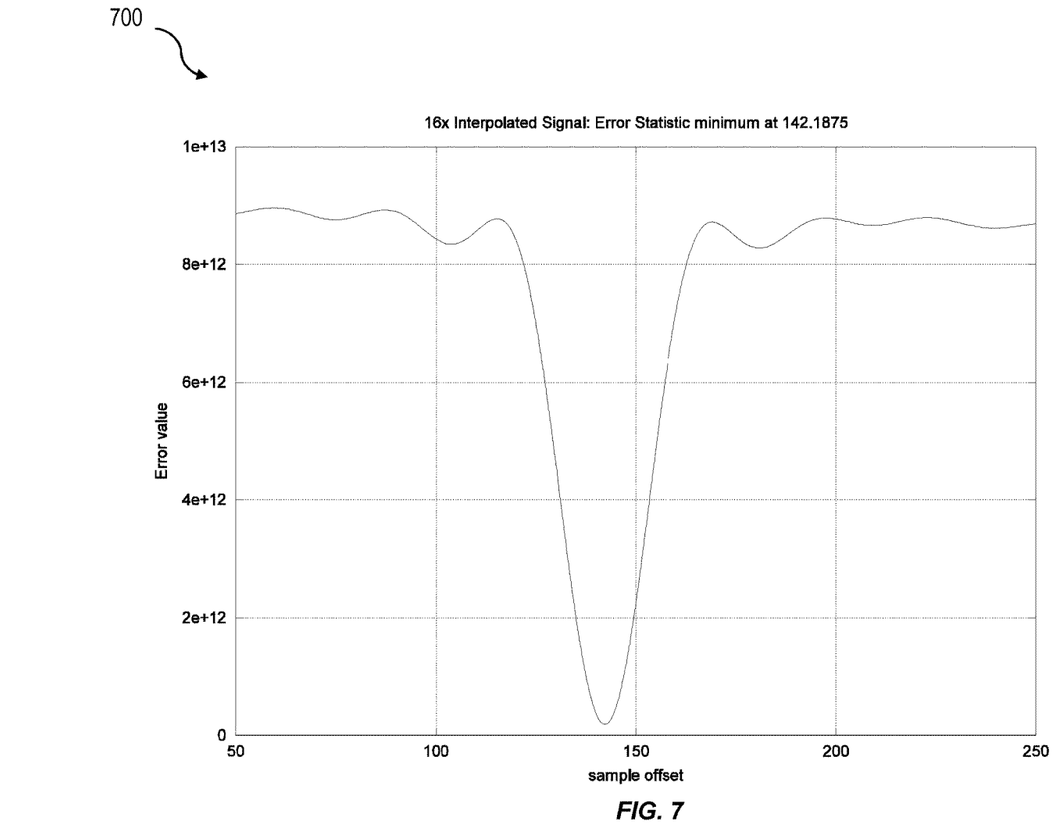
FIG. 7 is a plot illustrating an error statistic calculated with an interpolated input signal and amplified signal.

FIG. 5 is a plot 500 illustrating a graph of error statistic EC computed using the example input signal 208 and amplified signal 209 from FIGS. 4A and 4B. The minimum is at sample 142, which can be considered the coarse time-alignment value. FIG. 6 is a plot 600 illustrating an interpolated error statistic EF of the example error statistic EC illustrated in FIG. 5. The location of the minimum is shown to be located before the coarse estimate (e.g., sample 142). The minimum time-alignment value is at 142 and ³⁄₁₆ths sample points. FIG. 7 is a plot 700 illustrating an interpolated error statistic EF calculated with interpolated input signal 208 and amplified signal 209. In this example case, the location of the minimum is the same as shown in FIG. 6 (i.e., 142 and ³⁄₁₆ths sample points).

Figure 8:
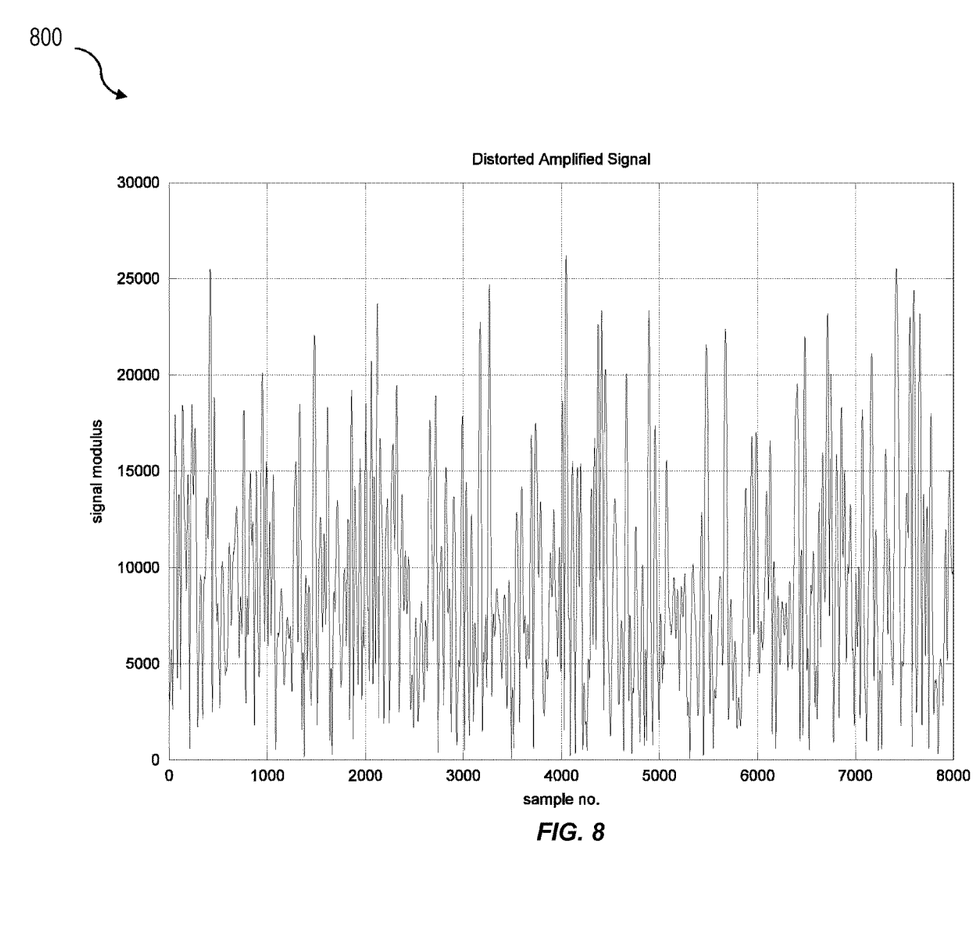
FIG. 8 is a plot illustrating the magnitude of an exemplary amplified signal, which has significant quadrature distortion, according to some implementations of the current subject matter.

FIG. 8 is a plot 800 illustrating the magnitude of an example amplified signal 209 (e.g., y), which has significant quadrature distortion added (e.g., a local oscillator value appears as a non-zero sample mean, there is cross talk between I and Q channels and the I and Q components are amplified to slightly different extents). The example amplified signal 209 illustrated in FIG. 8 corresponds to the example input signal 208 illustrated in FIG. 4A (but with more quadrature distortion than the signal illustrated in FIG. 4B)

Figure 9:
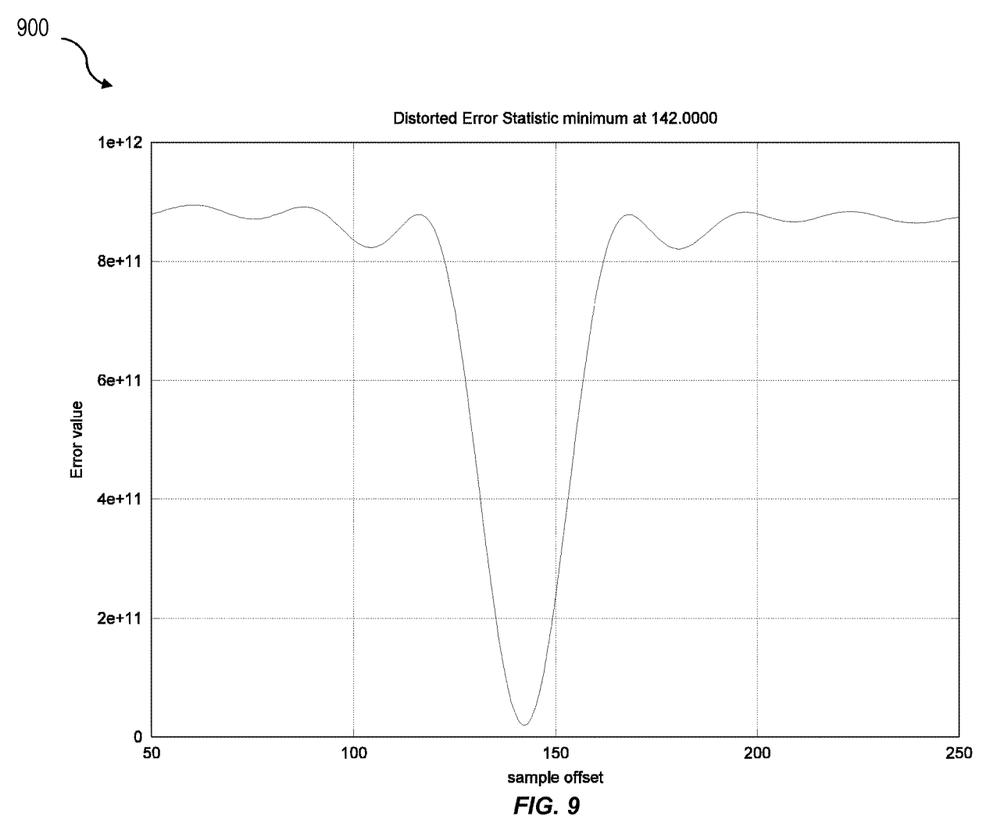
FIGS. 9 and 10 are plots illustrating the error statistic and interpolated error statistic for the example amplified signal illustrated in FIG. 8 having significant modulation distortion.
Figure 10:
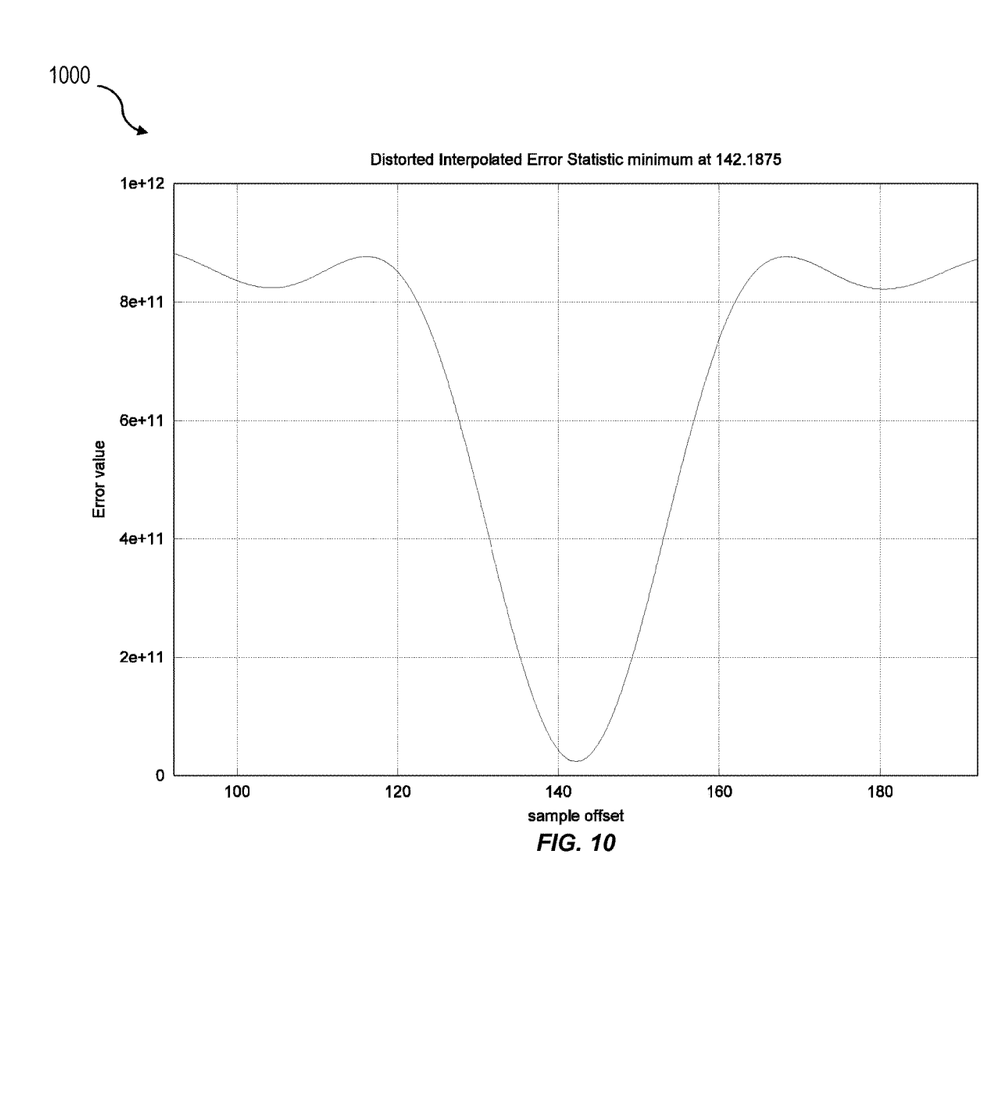

FIGS. 9 and 10 are plots (900, and 1000 respectively) illustrating the error statistic EC (FIG. 9) and interpolated error statistic EF (FIG. 10) for an amplified signal 209 shown in FIG. 8 containing significant modulation distortion. Despite the increase in quadrature modulation distortion, the time-alignment estimate for the signal with more distortion (FIG. 8) is exactly the same (i.e., at 142 and ³⁄₁₆ths sample points) as that determined for the signal having less distortion (FIG. 4B).

The subject matter described herein provides many advantages. For example, the current subject matter can be insensitive to quadrature errors on the amplified signal since it allows a time-alignment value to be determined when there is a significant, unknown quadrature error present. Further, the current subject matter can be computationally simple so that it can be implemented using inexpensive components, such as a field programmable gate array (FPGA), without requiring excessive resources.

Some formulations of the error statistic described herein can include the following desirable properties: all of the following modifications to a signal yield the same E value: $Y_k = ay_k$ different amplification on I and Q paths for any complex a; $Y_k = y_k + b\overline{y}_k$ cross-talk between the I and Q paths for any complex b; $Y_k = y_k + c$ local oscillator appearing as a constant c; and $Y_k = ay_k + by_k + c$ any combination of the above.

In some implementations, a variance of the difference between the input signal and the amplified signal need not be calculated. Not computing the variance can be advantageous because if one of the signals suffers from quadrature errors than a dip in the variance of the difference between the signals when the signals are aligned may not be observed and variance-based methods may fail. By not computing the variance, an incorrect time-alignment can be avoided (for example, when a radio transmitter system initializes). Moreover, not computing the variance can decrease the computational requirements and time requirements for estimating and performing time-alignment. For example, the current subject matter can interpolate the values of an error statistic, whereas computing the variance may require interpolation of the signals, which is computationally more intensive.

By way of illustration, consider a case when a radio transmitter introduces significant quadrature modulation error (e.g., there is significant cross-talk between the channels and the I and Q channels are amplified by different amounts), so the amplified signal is expressed as:

$$y_k = ax_k + b\overline{x}_k \quad (14)$$

where a and b are chosen so the signal powers are the same. For example, $$|a|^2 + |b|^2 = 1 \quad (15)$$

Near the true time-alignment value (for small epsilon)

$$y_k = ax_k + b\overline{x}_k + \epsilon_k \quad (16)$$

The variance of the difference between the signals is:

$$\mathrm{Var}(y-x) = \mathrm{Var}((a-1)x + b\overline{x} + \epsilon) \quad (17)$$

which can be expressed as:

$$\mathrm{Var}(y-x) = (|a-1|^2 + |b|^2)\mathrm{Var}(x) + \mathrm{Var}(\epsilon) \quad (18)$$

So for non-zero b value or for non-unity a values, the variance near the true time-alignment value is not necessarily small. In these cases, variance-based time-alignment methods break down. Typically this can happen at system startup—before any QMC has been applied. However, since QMC methods can rely on having time-aligned signals, time-alignment and QMC may not work. Rather than use a variance, some example implementations of the current subject matter use an error statistic that does not require computing the variance and so can be insensitive and independent from the amount of quadrature modulation error present.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the implementations described above can be directed to various combinations and subcombinations of the disclosed features and/or combinations and subcombinations of several further features disclosed above. In addition, the logic flows depicted in the accompanying figures and described herein do not require the particular order shown, or sequential order, to achieve desirable results. Other embodiments may be within the scope of the following claims.

What is claimed is:

1. A computer-implemented method, comprising:
receiving data characterizing a first signal and a second signal;
comparing, at a plurality of time-shifts, the first signal and a function of the second signal to estimate a time-difference between the first signal and the second signal, the function of the second signal including a linear combination of the second signal, a complex conjugate of the second signal, and a constant, the linear combination chosen for each of the plurality of time shifts to minimize the estimate at a given one of the plurality of time shifts and such that the linear combination varies between two or more of the plurality of time shifts; and
providing the comparison;
wherein at least one of the receiving, the comparing, and the providing is performed by at least one processor of at least one computing system.

2. The method of claim 1, wherein the comparing includes calculating an error statistic between the first signal and the function of the second signal for at least the plurality of time-shifts.

3. The method of claim 2, wherein the error statistic is a power difference between the first signal and the function of the second signal.

4. The method of claim 2, wherein the estimated time difference is one of the plurality of time-shifts corresponding to a minimum calculated error statistic.

5. The method of claim 2, further comprising
interpolating the error statistic to determine an interpolated error statistic;
wherein the estimated time difference corresponds to a minimum of the interpolated error statistic.

6. The method of claim 1, further comprising
aligning, based on the comparison and in time, the first signal and the second signal by a value corresponding to the estimated time-difference.

7. The method of claim 1, wherein the plurality of time-shifts include a range of values between a predetermined low value and a predetermined high value.

8. The method of claim 1, wherein
the first signal is a digitally encoded transmission signal; and
the second signal is generated by at least one of pre-distorting and applying quadrature modulation to the first signal, the second signal for transmission in a radio-transmitter.

9. The method of claim 1, wherein the providing the comparison includes at least one of storing, transmitting, and processing the comparison.

10. The method of claim 1, wherein the constant is a bias caused by local oscillation in the second signal.

11. The method of claim 1, wherein providing the comparison can include time aligning the first signal and the second signal based on the comparison.

12. A system comprising:
at least one data processor;
memory storing instructions which, when executed by the at least one data processor, causes the at least one data processor to perform operations comprising:
receiving data characterizing a first signal and a second signal;
comparing, at a plurality of time-shifts, the first signal and a function of the second signal to estimate a time-difference between the first signal and the second signal, the function of the second signal including a linear combination of the second signal, a complex conjugate of the second signal, and a constant, the linear combination chosen for each of the plurality of time shifts to minimize the estimate at a given one of the plurality of time shifts and such that the linear combination varies between two or more of the plurality of time shifts; and
providing the comparison;
wherein at least one of the receiving, the comparing, and the providing is performed by at least one processor of at least one computing system.

13. The system of claim 12, wherein the comparing includes calculating an error statistic between the first signal and the function of the second signal for at least the plurality of time-shifts.

14. The system of claim 13, wherein the estimated time difference is one of the plurality of time-shifts corresponding to a minimum calculated error statistic.

15. A non-transitory computer program product comprising a computer readable storage medium encoding instructions, which when executed by at least one data processor of at least one computing system, implement a method comprising:
receiving data characterizing a first signal and a second signal;

comparing, at a plurality of time-shifts, the first signal and a function of the second signal to estimate a time-difference between the first signal and the second signal, the function of the second signal including a linear combination of the second signal, a complex conjugate of the second signal, and a constant, the linear combination chosen for each of the plurality of time shifts to minimize the estimate at a given one of the plurality of time shifts and such that the linear combination varies between two or more of the plurality of time shifts; and providing the comparison;

wherein at least one of the receiving, the comparing, and the providing is performed by at least one processor of at least one computing system.

16. The non-transitory computer program product of claim 15, wherein the comparing includes calculating an error statistic between the first signal and the function of the second signal for at least the plurality of time-shifts.

17. The non-transitory computer program product of claim 16, wherein the estimated time difference is one of the plurality of time-shifts corresponding to a minimum calculated error statistic.

* * * * *